Feb. 23, 1965  L. N. YOHE  3,170,500
ANTI-SKID DEVICE
Filed March 5, 1964  2 Sheets-Sheet 1
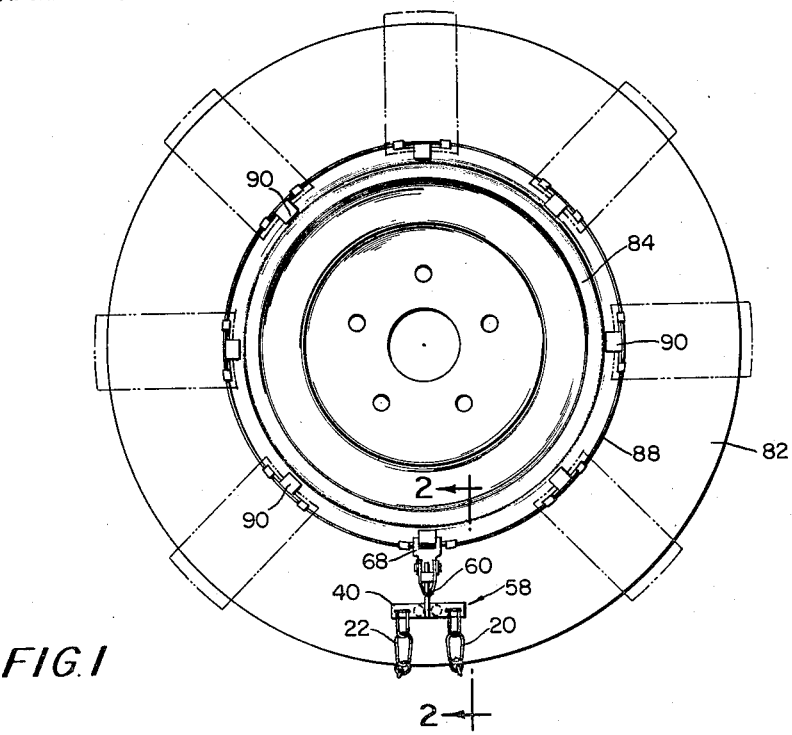
FIG. 1
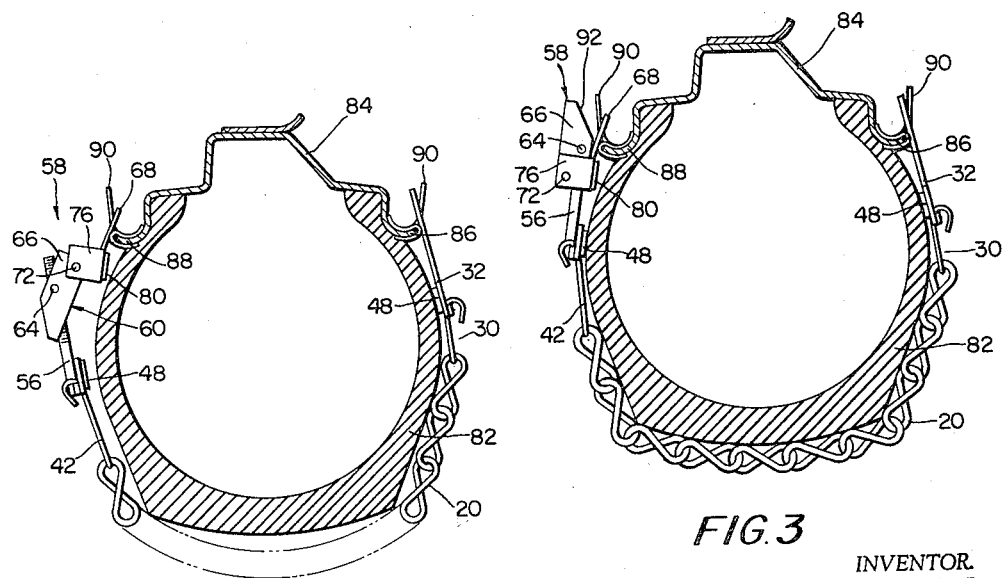
FIG. 2
FIG. 3
INVENTOR.
LESTER N. YOHE
AGENT

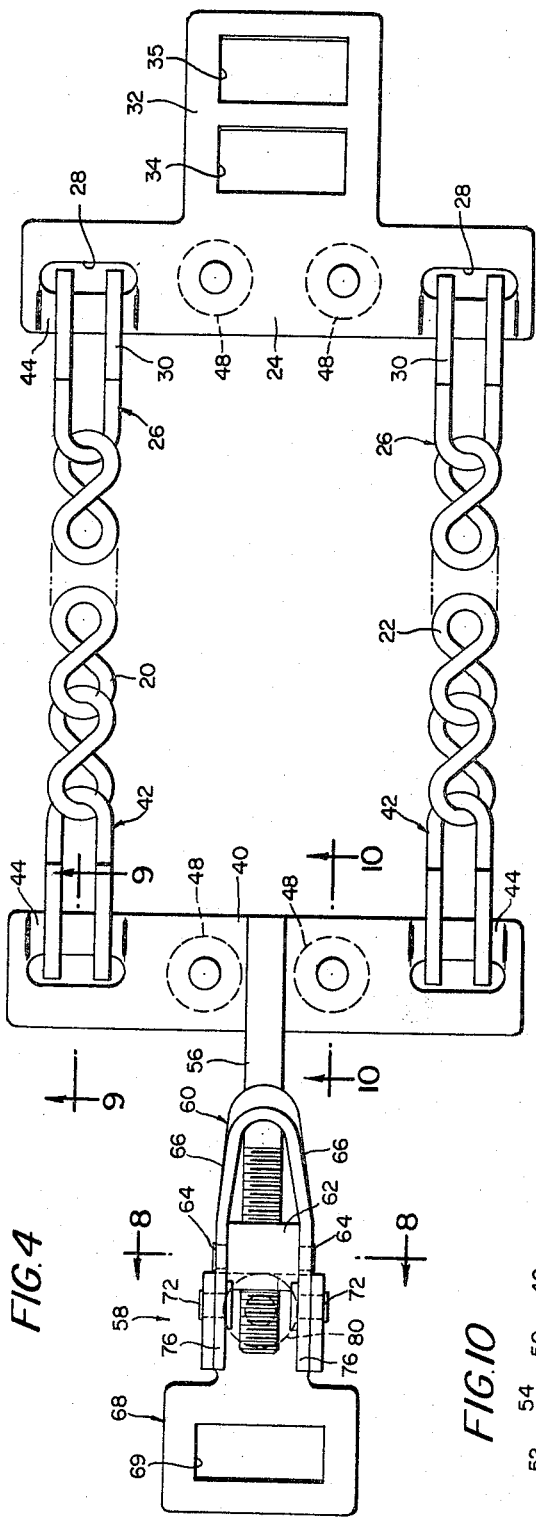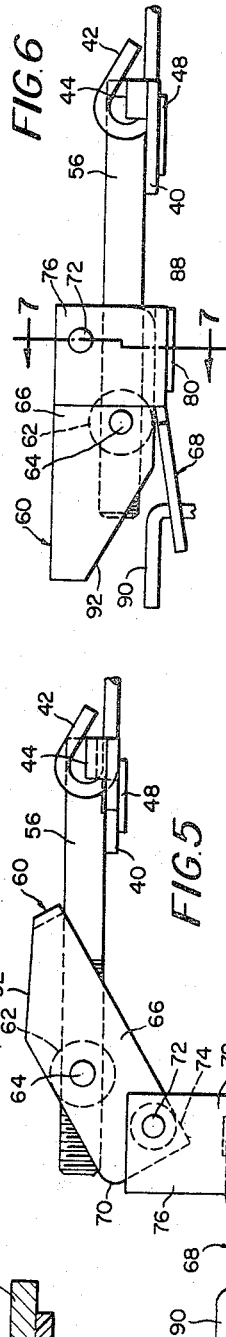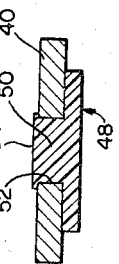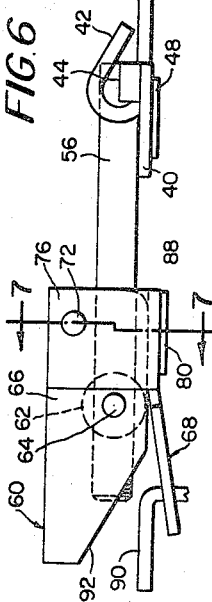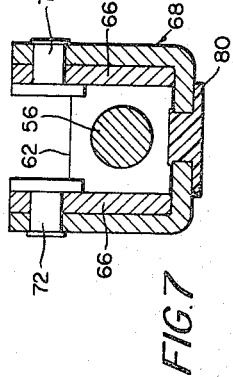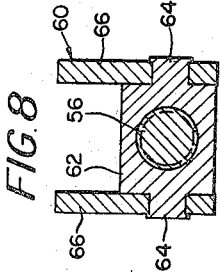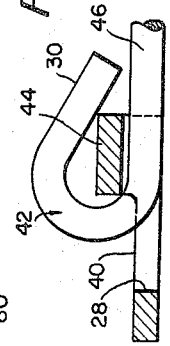

United States Patent Office 3,170,500
Patented Feb. 23, 1965

3,170,500
ANTI-SKID DEVICE
Lester N. Yohe, 1601 Melrose Ave., Havertown, Pa.
Filed Mar. 5, 1964, Ser. No. 349,613
8 Claims. (Cl. 152—233)

The invention hereinafter described and claimed has to do with anti-skid or traction devices and while of broader applicability, it is especially useful for automobiles. With still more particularity, the invention has to do with anti-skid traction devices of the type described in applicant's Patent No. 3,095,919.

The invention in the aforesaid patent resides in attachment means in the form of hooks or lugs carried on the rim flanges of a vehicle wheel on both sides of the tire whereby individual traction devices or cross-links may releasably be attached around the tire by securing one end over the hook on one side of the tire, drawing the traction or chain portion of the device around the tire and securing the opposite end to the hook on the other side of the tire.

It is a primary object of the present invention to provide an improved traction device or cross-link for use with attachment means on opposite sides of a wheel, such as described in applicant's above identified patent.

Another object is to provide such an improved cross-link which may be easily and securely attached around a tire under even the most unfavorable weather and road conditions.

A further object of the invention is the provision of a cross-link which can be tightly secured around a tire yet will not, when in use, cause scuffing or rubbing damage to the tire.

Still another object is to provide a cross-link traction device which is easily and quickly adjusted to fit tires and wheels of various sizes yet without sacrifice of efficiency and security.

In accordance with the above, and first briefly described, the invention comprises a traction device, more commonly known as a cross-link, preferably comprising a pair of short chain sections in spaced parallel relationship with each other with means at the ends of the chain sections for releasably securing them to attachment means such as lugs or hooks secured to the rim on opposite sides of the tire. Extensible means is provided on at least one end of the cross-links whereby the assembly easily may be adjusted in length enabling it to be so slipped over the attachment means, and then be drawn tightly around the tire and securely locked in place by toggle action, and having means preventing damage to the tire during use.

In the drawings:

FIG. 1 is a side elevational view of a wheel and tire showing cross-link traction assemblies in accordance with the preferred embodiment of the present invention attached thereto;

FIG. 2 is a sectional view taken along line 2—2 of FIG. 1, but showing a cross-link in the process of being attached around the tire, with the extensible means still in its open condition;

FIG. 3 is similar to FIG. 2 but shows the cross-link in its tightly secured condition around the tire, with the extensible means now in closed and locked condition;

FIG. 4 is a plan view of the preferred cross-link traction device in accordance with the invention with portions of the chain links broken away in the center;

FIG. 5 is a side elevation view of the extensible means at one end of the cross-link in its open or extended condition;

FIG. 6 is a view similar to FIG. 5 but with the extensible means in its closed and locked condition over a hook;

FIG. 7 is a sectional view taken along line 7—7 of FIG. 6;

FIG. 8 is a sectional view taken along line 8—8 of FIG. 4;

FIG. 9 is a sectional view taken along line 9—9 of FIG. 4; and

FIG. 10 is a sectional view taken along line 10—10 of FIG. 4.

Now, with reference to the details of the various figures of the drawing, and particularly with FIG. 4, it will be seen that this preferred embodiment of the invention has a pair of traction elements, illustrated here as short chain sections 20 and 22 having their right-hand ends connected to opposite ends of a cross-bar 24, as by U-shaped links 26. Other suitable traction elements, of course, may be substituted for the chain sections without departing from the spirit and scope of the invention. Ends of the links 26 extend through slots 28 in bar 24 and are turned over, as indicated at 30, in a manner to secure them to and prevent them from becoming detached from the bar but with sufficient play to permit relatively free pivotal action. Crossbar 24 is a flat solid bar of rigid material, such as metal, having a portion 32 extending centrally from its right-hand side and formed with two openings 34 and 35 either of which may be used for securing that end over a hook or lug on one side, usually the inside, of the wheel rim, as described later. It will be understood that the loops need not be formed from the bar stock, but may be separately formed and secured in place, as by welding, for example.

The opposite or other ends of the cross-chains 20 and 22 are secured to a cross-bar 40 which, except for not having an extension like 32, is generally similar in shape to cross-bar 24. As shown in FIG. 9, both cross-bars 24 and 40 have offset portions 44 where the U-shaped links 26 and 42 are secured to them thus to keep their parallel arms 46 aligned with the bars.

Each of the bars is provided with a pair of anti-scuff cushion pads 48, secured thereto, as seen in FIG. 10, by a shank 50 extending through the hole 52 with its outer end 54 swaged over to form a retaining flange. When the cross-link assembly is secured to a tire, as described later, the arrangement of U-shaped links 26 and 42 and scuff-pads 48 space bars 24 and 40 away from the tire, thus to prevent scuffing damage by these parts to the tire side walls.

Suitably secured to the mid portion of bar 40, as by welding, and extending to the left at right angles to the bar is a rod 56. The outer end of the rod is threaded to receive a toggle device 58 providing the means for extending and contracting the cross link assembly, and for securing this end to a hook on the outer side of the wheel, as described hereinafter. The toggle comprises a U-shaped link member 60 pivotally mounted substantially at its mid portion to a short stub or swivel shaft 62 (FIGS. 7 and 8) as by pin extensions 64 passing through the opposite arms 66 of U-shaped member 60. The shaft 62 has a threaded aperture extending diametrically through its central portion to receive in threaded engagement therewith the threaded end of rod 56 whereby the location of the U-shaped member 60 on the rod is adjustable to either reduce or extend the overall length of the cross-link assembly, as brought out more clearly hereafter.

A hook engaging member 68 having a loop 69 is secured to the outer end 70 (FIG. 5) of U-shaped member 60 as by pins 72 passing through the lower left hand corner 74 of the parallel arms 66 of U-shaped member 60, and the up-turned extensions or ears 76 of the hook engaging member 68. The pins are riveted over on both ends to hold them securely in place, yet permit relative pivotal movement of the parts. The right-hand or inner end 78 of the member 68 is also provided with an anti-scuff cushion pad 80 (FIG. 7) similar to pads 48 on bars 24 and 40, and secured thereto in similar fashion.

Having now described the mechanical structure of the cross-link assembly embodying the invention, the mounting thereof over a tire on the wheel of automobiles, will now be described.

In FIG. 2 a tire 82 is shown mounted on a rim 84 having inner and outer oppositely extending peripheral flanges 86 and 88 each with a plurality of hooks on lugs 90 secured thereto, as seen in FIG. 1, in suitable manner, such as described in applicant's above identified patent, or in applicant's copending application entitled Clip For Attaching Anti-Skid Cross-Chains to Vehicle Wheels, Serial No. 390,816, filed August 20, 1964. The hooks preferably are equally spaced around the periphery of the rim flanges, those on opposite flanges being transversely aligned whereby the cross-link assembly may be secured around the tire.

Looking now at FIG. 2, it is seen that one of the loops 34 or 35 (FIG. 4) on the crossbar extension 32 is secured over the hook 90 on the right-hand, or inner flange 86 of the rim, the chains 20 and 22 are drawn transversely around the tire and the loop 69 secured over the hook 90 on the outer flange 88 of the rim while in its open or extended condition, as seen in FIG. 5. The loose condition of the cross-link assembly around the tire is then as shown in FIG. 2. At this point in the mounting procedure the swivel loop 60 is rotated in a clockwise direction about pivot 64, thus to draw the cross-link assembly tightly around the tire. At the end of this movement the pivot point 64 has moved to the position shown in FIG. 3, that is, over center relative to pivot 72, thus effectively locking the cross-link assembly to the wheel. In this condition, any forces exerted by a drag on the chains, tends only to draw the toggle more tightly into its locked condition.

If after moving the assembly to this condition, it is too loose around the tire, it is merely necessary to reverse the locking procedure, as described above, remove the loop 69 from its hook and rotate the toggle assembly on the threaded portion of rod 56 to move it to the right relative to the rod (as seen in FIG. 5) thus effectively shortening the linkage to take up any slack. Conversely, if it is impossible to rotate the swivel member 60 sufficiently to lock the assembly around the tire, the toggle may be rotated in the opposite direction on the rod to increase the effective length of the cross-link so that it can be moved to its completely locked condition, as shown in FIG. 6. The toggle member 60 is beveled, as at 92, to provide easy access for a finger to move it out of locked position (FIG. 3).

FIG. 1 shows that a plurality of these cross-links may be secured around the periphery of the wheel depending upon the number of hook or lug members provided on the rim flanges.

With the assembly properly in place around the tire, as seen in FIG. 3, the anti-scuff cushion pads provided in crossbars 24 and 40 and the loop 68 bear against the side walls of the tire in a manner to space the metallic elements from the side wall, thus to prevent damage to the side walls by these members during operation of the vehicle with these assemblies attached to its wheels.

What is claimed is:

1. An anti-skid traction device for vehicle wheels having a rim, a tire mounted on said rim, and attachment elements secured to said rim on opposite sides of said tire, said device comprising:
    (a) a pair of short flexible traction element sections;
    (b) first and second rigid bars;
    (c) means attaching the opposite ends of said traction elements to a corresponding one of said bars to arrange said traction elements substantially in parallel spaced relationship with each other;
    (d) means on said first bar for releasably securing it to an attachment element on the rim at one side of said tire;
    (e) extensible-retractible toggle means on said second bar for releasably securing said second bar to an attachment element on the rim at the other side of said tire with said traction elements secured around the tread from one to the other side of said tire and locked in place;
    (f) said extensible-retractible toggle means comprising pivotably connected linkage movable over-center to lock the traction device in place; and
    (g) screw means for adjusting the length of said device to fit tires of different sizes.

2. A traction device according to claim 1 wherein said traction elements comprise a pair of flexible driving elements of sufficient length to traverse the tread portion of said tire.

3. A traction device according to claim 1 and further including anti-scuff means on said bars to space said bars from the tire to prevent scuffing damage to the tire.

4. A traction device according to claim 1 wherein said means on said first bar to releasably secure it to said rim attachment means comprises a centrally located bar portion extending parallel to said traction elements and having a plurality of aligned openings any one of which can be used for such attachment.

5. A traction device in accordance with claim 1 wherein said toggle means comprises:
    (a) a first link pivotally mounted at a point between its ends to said second bar;
    (b) a second link pivotally mounted at a point on said first link adjacent one end thereof, and
    (c) means on said second link for releasable securement thereof to the said attachment element on the other side of said rim while said toggle is in its extended condition, and whereby said first link may be rotated about said pivot points in a manner to move its pivot point over center relative to the pivot point of said second link thus to draw said traction elements tightly around said tire whereby drag forces on said traction elements will be opposed by the over center relationship of said pivot points.

6. A traction device according to claim 5 and further including a threaded shaft secured to said second bar and extending substantially parallel to said traction elements, and wherein said toggle means is mounted on said threaded shaft in a manner to be moved in either direction thereon whereby the overall length of the traction device may be adjusted enabling it to fit tires of different sizes.

7. A traction device according to claim 6 wherein:
    (a) said first link comprises a U-shaped member, the arms of which are bridged by a pivotal connecting element having a threaded aperture therethrough to receive said threaded shaft; and
    (b) said second link is pivotally mounted to the free extremities of said arms and constructed so as to permit said over-center movement of said links to lock the traction elements securely in place around said tire.

8. An anti-skid traction device for vehicle wheels having a rim, a tire mounted on said rim, and attachment elements secured to said rim on opposite sides of said tire, said device comprising:
    (a) a pair of short flexible chain sections for traversing the tread portion of said tire;
    (b) first and second rigid bars;
    (c) means pivotally securing the opposite ends of said chain sections to a corresponding one of said bars to fix said chain sections in parallel spaced relationship with each other;
    (d) means forming a plurality of aligned openings in an extension on said first bar, any one of said openings being usable for securing said bar to an attachment element on the rim at one side of said tire;

(e) anti-scuff cushion means on said first bar to space said bar from said tire to prevent scuffing damage to the tire by said bar;
(f) a threaded shaft secured to and comprising an extension of said second bar;
(g) anti-scuff cushion means on said second bar to space said bar away from said tire to prevent scuffing damage to the tire by said bar; and
(h) extensible-retractible toggle means on said second bar for releasably securing said second bar to an attachment element on the rim at the other side of said tire with the chain sections tightly wrapped around the tread from one to the other side of said tire and locked in place, said toggle means comprising:
   (1) a U-shaped first link having spaced parallel arms connected at one end;
   (2) a pivotally mounted connecting element bridging said arms intermediate its ends and having a threaded aperture therethrough to receive said threaded shaft whereby the position of said U-shaped link on said rod may be adjusted;
   (3) a second link having a U-shaped portion, the arms of which are pivotally attached to the free extremities of the arms of said U-saped first link, constructed so as to permit said U-shaped first link to be rotated about said pivot points in a manner to move the pivotal connecting element over center relative to the pivot point of said second link thus to draw said chain sections tightly around said tire, whereby drag forces on said chain sections will be opposed by the over center relationship of said pivot points; and
   (4) anti-scuff cushion means on said second link to space it away from said tire to prevent scuffing damage to said tire thereby.

References Cited by the Examiner
UNITED STATES PATENTS

| | | | |
|---|---|---|---|
| 1,529,558 | 3/25 | Staggers | 152—232 X |
| 2,528,203 | 10/50 | Zwosta | 152—233 |
| 2,987,092 | 6/61 | Marcanello | 152—233 |
| 3,095,919 | 7/63 | Yohe | 152—236 |

ARTHUR L. LA POINT, *Primary Examiner.*